United States Patent [19]

Bhandari et al.

[11] Patent Number: 5,066,337
[45] Date of Patent: Nov. 19, 1991

[54] THERMAL POWER TRANSFER SYSTEM USING APPLIED POTENTIAL DIFFERENCE TO SUSTAIN OPERATING PRESSURE DIFFERENCE

[75] Inventors: Pradeep Bhandari, Glendora; Toshio Fujita, Arcadia, both of Calif.

[73] Assignee: The United States of America as represented by the Administrator of the National Aeronautics and Space Administration, Washington, D.C.

[21] Appl. No.: 568,130

[22] Filed: Aug. 16, 1990

[51] Int. Cl.$^5$ ............................................. H01L 37/00
[52] U.S. Cl. ................................. 136/202; 136/205; 429/11; 429/120
[58] Field of Search ............... 136/200, 202, 205, 230, 136/236.1; 310/306; 322/2 A, 2 R; 429/5, 11, 50, 104, 112, 120

[56] References Cited

U.S. PATENT DOCUMENTS

| 3,897,271 | 7/1975 | Kim | 136/202 |
| 3,931,532 | 1/1976 | Byrd | 310/4 |
| 4,042,757 | 8/1977 | Jones | 429/104 |
| 4,049,877 | 9/1977 | Saillant et al. | 429/11 |
| 4,098,958 | 7/1978 | Bettman | 429/17 |
| 4,338,560 | 7/1982 | Lemley | 322/2 A |
| 4,505,991 | 3/1985 | Weber | 429/11 |
| 4,510,210 | 4/1985 | Hunt | 429/11 |
| 4,808,240 | 2/1989 | Sievers | 136/202 |
| 4,857,421 | 8/1989 | Ernst | 429/104 |

FOREIGN PATENT DOCUMENTS 0148084  8/1989  Japan .................... 310/306

OTHER PUBLICATIONS

C. P. Bankston et al., Experimental and Systems Studies of the Alkali Metal Thermoelectric Converter for Aerospace Power, Sep., Oct. 1983, pp. 442–448 Journal of Energy, vol. 7, No. 5.
Ford Motor Company, A Thermoelectric Device Based on Beta-Alumina Solid Electrolyte, Neill Weber, May 25, 1973, pp. 1–8.
Science, 2 Sep. 1983, vol. 221, No. 4614, Thermoelectric Energy Conversion with Solid Electrolytes by Terry Cole.

Primary Examiner—Brooks H. Hunt
Assistant Examiner—Chrisman D. Carroll
Attorney, Agent, or Firm—Thomas H. Jones; Harold W. Adams; John R. Manning

[57] ABSTRACT

A thermal power transfer system using a phase change liquid gas fluid in a closed loop configuration has a heat exchanger member connected to a gas conduit for inputting thermal energy into the fluid. The pressure in the gas conduit is higher than a liquid conduit that is connected to a heat exchanger member for outputting thermal energy. A solid electrolyte member acts as a barrier between the gas conduit and the liquid conduit adjacent a solid electrolyte member. The solid electrolyte member has the capacity of transmitting ions of a fluid through the electrolyte member. The ions can be recombined with electrons with the assistance of a porous electrode. An electrical field is applied across the solid electrolyte member to force the ions of the fluid from a lower pressure liquid conduit to the higher pressure gas conduit.

6 Claims, 2 Drawing Sheets

THERMAL POWER TRANSFER SYSTEM USING APPLIED POTENTIAL DIFFERENCE TO SUSTAIN OPERATING PRESSURE DIFFERENCE

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The present invention is directed to a thermal power transfer system using a phase change fluid in a closed loop configuration for transferring thermal energy and, more particularly, to a passive thermal power transfer system capable of sustaining a relatively high pressure difference between the gas and liquid phases for maximizing the heat transfer capabilities of the system.

BACKGROUND ART

Numerous examples of thermal power transfer systems exist in the prior art, including relatively passive thermal power transfer loops. These systems are of particular interest in applications in outer space, where the high cost of servicing any such system and the expense of launching any such system dictates a highly reliable system with a minimal utilization of moving parts.

A heat exchange system for use in a thermoelectric power generator is disclosed in U.S. Pat. No. 3,931,532. In this system, a fluid such as potassium could be heated and vaporized for transmitting heat to junctions of the thermoelectric generator. Heat is released when the potassium condensates, and this liquid condensate is returned by a capillary flow along a wick, so that it can be reheated and vaporized to repeat the working cycle.

U.S. Pat. No. 3,897,271 discloses a static self-contained electric power generating system wherein liquid metal such as sodium can transfer heat from a nuclear heat source to generate power.

U.S. Pat. No. 4,808,240 discloses a sodium heat engine utilizing a beta-alumina solid electrolyte tube filled with liquid sodium. The sodium ions are able to pass through the tube structure, while electrons are not. The electrons are instead carried outside of the tube through an external circuit with a load for generating power. In this regard, heat is applied to the liquid sodium to elevate its pressure, and sodium ions then pass through the beta-alumina solid electrolyte to create an electrical potential difference between both sides of the electrolyte member for generating power. The gas size of the electrolyte is at a relatively low pressure to facilitate the transmission of the sodium ions across the solid electrolyte.

Conventional passive thermal power transfer loops utilizing capillary forces to sustain the operating pressure difference between the gas and the liquid phase are limited in power levels by the minimum practical pore size of their wicks. There is still a need in the prior art to increase the thermal power transfer levels that can be achieved in such systems, while maintaining the static or passive characteristics of such systems.

STATEMENT OF THE INVENTION

The present invention provides a thermal power transfer system using a phase change liquid metal fluid in a closed loop configuration. A gas conduit for transmitting the thermal energy through a heat exchanger to output the thermal energy is provided on one side of the loop configuration, while a liquid conduit for transferring the liquid metal from the heat exchanger is provided. Another heat exchanger for inputting thermal energy into the system is utilized in connection with the gas conduit to raise the free energy state of the gas. As a result, the pressure of the gas conduit is elevated above that of the liquid conduit. A barrier in the form of a solid alkali metal electrolyte member is provided to isolate the gas phase of the metal from the liquid phase of the metal. A porous electrode is operatively positioned relative to the solid electrolyte member on the gas side, and an applied electrical potential difference can be used to drive ions of the fluid in the liquid state through the solid electrolyte member to the gas side of the barrier. The vapor-liquid interface will be located adjacent to the porous electrode.

More specifically, the present invention can utilize a beta-alumina solid electrolyte with sodium as the fluid. The utilization of the solid barrier electrolyte member permits a permselective barrier having the capacity of conducting sodium ions to permit an increase in the pressure differential across the barrier member, compared to conventional thermal power transfer loops utilizing wicks or capillary forces. The increase in the pressure capacities of the system permits an increase in efficiency in transmitting thermal energy.

Although the addition of thermal energy provides the actual pumping action for the system, the characteristics of the solid electrolyte barrier member can also be used as a modulator or controller of the system operation. For a given set of flow rates and pressure levels, a certain level of applied potential will be required for a force balance of the two phases of the metal fluid. If the applied potential is larger than that required for the force balance for a certain flow rate, then larger flow rates will result and vice versa.

Other objects and many of the attendant advantages of this invention will be readily appreciated in reference to the following detailed description when considered in conjunction with the accompanying drawings, in which like reference numbers designate like parts throughout the figures thereof.

DETAILED DESCRIPTION OF THE INVENTION

The following description is provided to enable any person skilled in the field of thermal dynamics to make and use the present invention, and sets forth the best modes contemplated by the inventors of carrying out their invention. Various modifications, however, will remain readily apparent to those skilled in the art, since generic principles of the present invention have been defined herein specifically to provide an improved thermal power transfer loop using an applied potential difference to sustain a high operating pressure difference between a gas and liquid phase.

Thermal power transfer loops transfer heat energy from one location to another. In outer space application, such systems typically use a heat pipe with an adiabatic section to perform basically as a heat engine, with a source at a slightly higher temperature than the heat sink. These thermal power transfer loops have traditionally utilized capillary forces, derived from porous wicks, to sustain the pressure difference between the higher pressure vapor phase and a lower temperature liquid phase. The purpose of the capillary force is to provide a flexible meniscus which sustains the pressure difference between the two phases and which allows a mass transfer of the working fluid from a liquid to a gas zone. The maximum thermal power that is transferrable (subject to the condenser area and its coupling to the heat sink) in capillary thermal power transfer loops is governed by the maximum pressure difference sustainable through the maximum capillary force generated by the wick pores. The smaller the pore size, the larger this capability. The minimum pore size achievable, however, is limited by practical manufacturing considerations. In addition, potential problems exist in plugging of such small pores over a large lifetime of use. As a result, there is a clear limitation of the capacity to transfer thermal power in such a capillary thermal power transfer loop. In designing a thermal power transfer loop, other considerations must be taken into account besides simply a high power transfer capability. These considerations include, for example, the temperature drop associated with the pressure difference, the degradation of the thermal potential from the source to the sink, the compactness of the system, the mass of the system, etc., in producing an optimum power transfer system for outer space application. When thermal potential degradation temperature drop from heat source to sink is not a major concern, then the maximum pressure differential in order to facilitate the transfer of large thermal power levels has become a prior art limitation.

Figure 1:
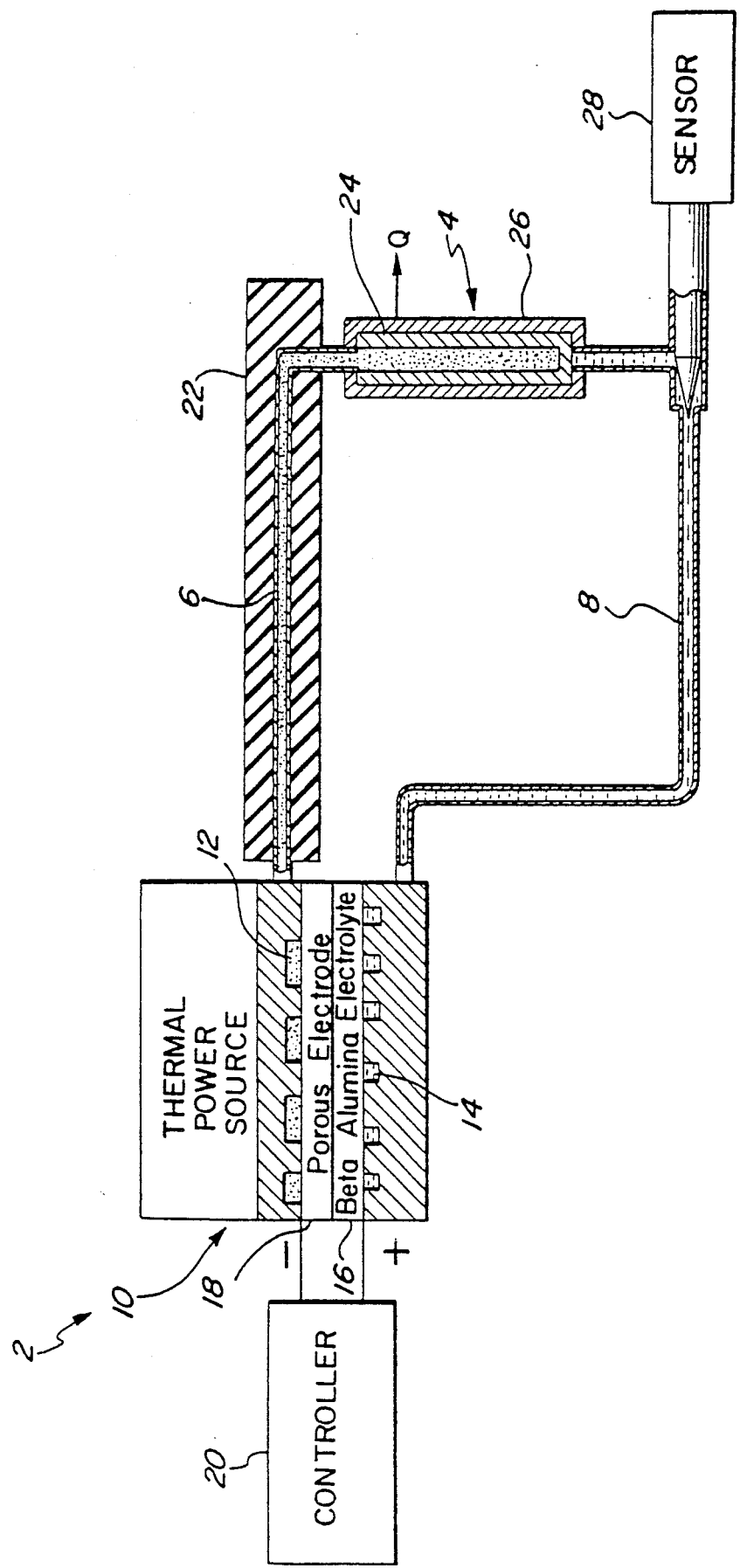
FIG. 1 is a schematic view of a thermal power transfer system.

Referring to FIG. 1, a thermal power transfer system 2 of the present invention is schematically disclosed. A heat exchanger 4 of a conventional design can be connected to a high pressure gas conduit line 6 and to a lower pressure liquid conduit line 8. Heat is supplied to the heat exchanger 4 via the high pressure gas line 6 through a fluid such as sodium. Thermal energy is entered into the high pressure gas line from a thermal power source via a heat exchanger 10. The heat exchanger 4 can be operatively connected to a vapor channel member or manifold 12 that communicates with the high pressure gas conduit 6. The lower pressure liquid conduit line 8 is connected to a liquid channel manifold 14 and a barrier member 16 in the form of an alkali metal solid electrolyte such as a beta-alumina, in a chemical form which is an ion conductor, is utilized. For our purposes, the beta-alumina solid electrolyte has a unique property of preferentially conducting sodium ions compared to electrons. Additional information on a solid electrolyte member can be found in "Experimental and System Studies of the Alkali Metal Thermoelectric Converter for Aerospace Power," C.P. Bankston et al., Journal of Energy, Vol. 7, No. 5, Sep-Oct 1983 at page 442.

Operatively positioned adjacent to the beta-alumina electrolyte 16 is a porous electrode 18 that can conduct electrons and can further allow sodium ions to pass therethrough wherein the electrons and sodium ions can then recombine to form sodium. The electrode 18 can be a relatively thin metal that is evenly deposited on the gas side of the solid electrolyte member 16. The design characteristic is that the electrode 18 must be sufficiently thin and porous to permit the egress of sodium ions from the electrolyte member. The specific configuration of the alkali metal electrolyte member 16 will depend upon the particular utilization and pressure difference that is necessary to achieve the purposes of the thermal power transfer system 2.

Figure 2:
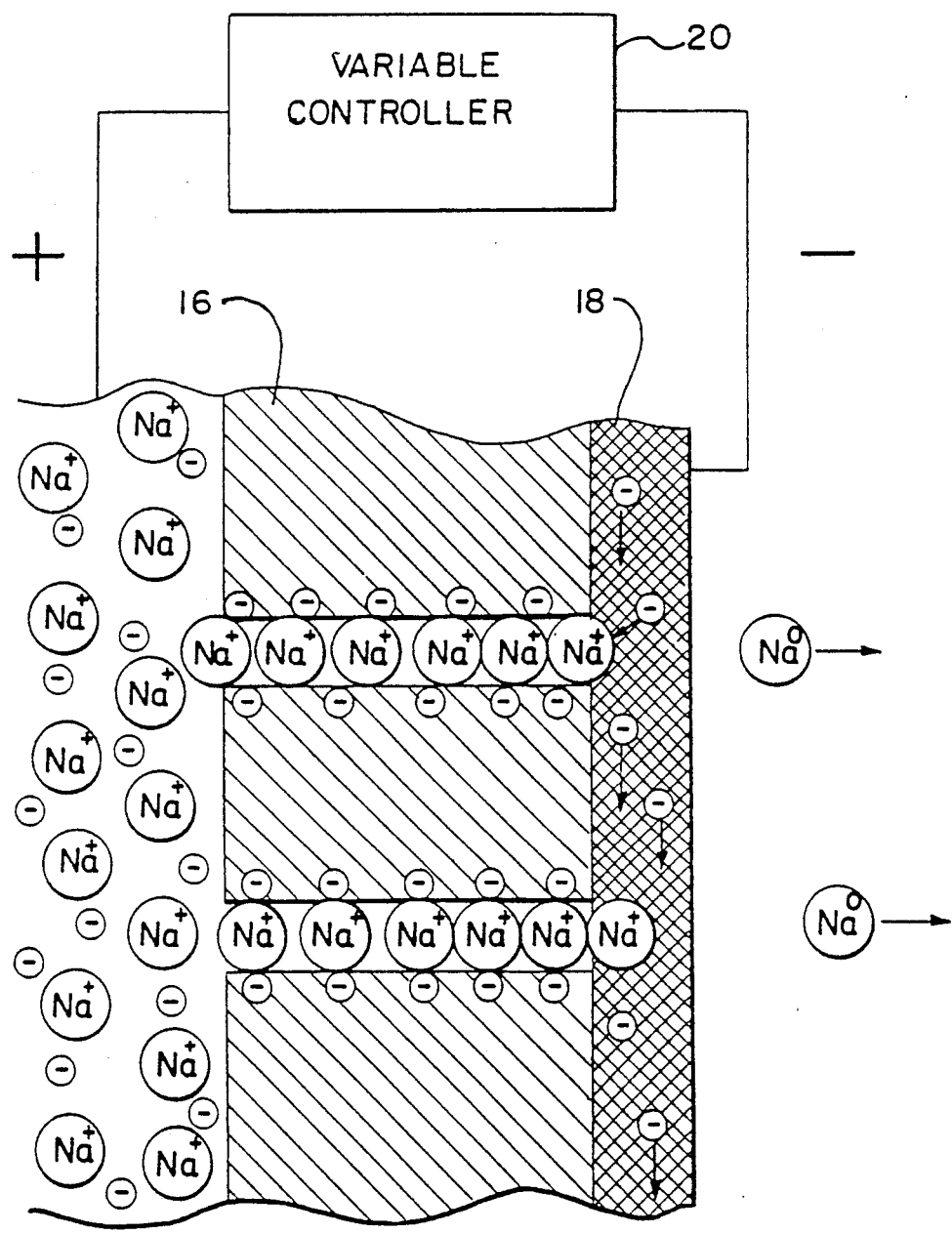
FIG. 2 is a schematic view of a solid electrolyte barrier.

Referring to FIG. 2, a schematic cross-sectional view of the beta-alumina solid electrolyte 16 and porous electrode 18 is disclosed. The positive sodium ions in a liquid form can pass through the electrolyte member 16 as a result of the potential difference applied across electrolyte member 16 by the controller 20. The liquid phase of the sodium metal is at a lower pressure than the gas phase. An adequate voltage potential difference that is applied across the electrolyte with the assistance of the porous electrode 18 is capable of sustaining this pressure differential. On the gas side of the barrier member 16, the sodium ions recombine with the electrons and are further subject to the inputted thermal energy from a thermal power source (not shown) to vaporize into a gaseous form. The operating temperature range should be greater than 100° C. (which is the melting point of the liquid metal sodium), and the vaporized sodium atoms are collected in the vapor channel manifold 12 and egress to the vapor or gas conduit 6. Appropriate insulation 22 insulates the conduit 6 as it travels to the heat exchanger 4.

The heat exchanger 4 comprises a conventional wick member 24 and an exterior heat exchanging housing 26, as shown in FIG. 1. This heat exchanger 10 basically serves the function of a condenser, and the liquid sodium is then returned to the liquid side of the alkali metal 16 via the liquid conduit 8. A thermal control valve system 28 can also be utilized to regulate the flow as an optional feature.

Since the alkali metal electrolyte 16 is in the form of a solid plate, it acts as a barrier between the gas and liquid phases in the heat addition zone adjacent the heat exchanger 4. The actual pressure differential sustainable by this barrier 16 will be a function of the plate thickness and its structural properties. As can be readily appreciated, a substantially higher maximum pressure differential is sustainable than that capable when relying upon capillary forces of a wick.

The beta-alumina solid electrolyte member 16 has the unique property of preferentially conducting sodium ions compared to the electrons, and therefore acts as a permselective barrier. If the external circuit was left open by the controller 20, the pressure differential between the liquid and the gas phases would force the sodium ions within the solid electrolyte member 16 towards the low pressure surface. This would cause the low pressure surface to acquire a net positive charge. This net positive charge would build up until the electrical field across the electrolyte member 16 is strong enough to stop the flow of sodium ions. At this point, the force on the sodium ions due to the pressure differential will be balanced by the force on the ions due to the buildup of the electrical field.

In the present invention, the controller 20 utilizes this unique property so that a positive potential is applied to the liquid zone adjacent the solid electrolyte 16, thereby tending to force sodium ions towards the high pressure gas zone, whereas the high pressure on the gas side tends to force the ions towards the liquid zone. Hence, an adequate positive potential field will balance this pressure differential. The potential field basically sustains the pressure differential across the electrolyte barrier 16, just like a vapor/liquid meniscus in capillary force based thermal power transfer loops. The actual pumping action of the thermal power transfer loop is achieved by the input of the thermal energy from the heat exchanger 4 and the condensation and removal of the heat energy at heat exchanger 10. As can be readily appreciated, this is basically a passive system, and the loss factors in this system are the electrical losses due to any resistivity of the alkali metal electrolyte 16 and its porous electrode 18 and the thermal losses associated with the insulation properties of the system. Theoretically, the controller 20 can also be utilized to, in effect, provide additional pumping of sodium ions from the low pressure side to the high pressure side of the electrolyte 16 over and above that provided by the thermal energy input, and the controller 20 can vary the applied electrical field to control the flow rate.

As can be readily appreciated, this high thermal power transfer loop has the capacity of transferring increased thermal power from one location to another by using a passive system with no moving parts. Accordingly, long term reliability is achieved for applications such as spacecraft.

Although the invention has been described in detail in the foregoing for the purpose of illustration, it is to be understood that such detail is solely for that purpose, and that variations can be made herein by those skilled in the art without departing from the spirit and scope of the invention in the following claims.

We claim:

1. A thermal power transfer system using a phase change liquid-gas fluid in a closed loop configuration, comprising:
   a gas conduit;
   a liquid conduit;
   a heat exchange member for inputting thermal energy into the fluid so that the pressure of the gas conduit is higher than the liquid conduit;
   barrier means between the gas conduit and the liquid conduit to maintain a pressure differential while permitting transmission of the fluid through the barrier means, including a solid electrolyte member having the capability of transmitting ions of the fluid through the electrolyte member and a porous electrode operatively positioned relative to the electrolyte member for creating an electrical field across the electrolyte member to drive the ions of the fluid through the solid electrolyte member;
   means, attached to the electrode member, for applying an electrical field to force the ions of the fluid from the lower pressure liquid conduit to the higher pressure gas conduit, and
   means, connected to the gas conduit and liquid conduit for outputting thermal energy.

2. The thermal power transfer system of claim 1 wherein the fluid is sodium.

3. The thermal power transfer system of claim 1 further including a thermal control valve system to regulate the flow rate of the liquid fluid.

4. The thermal power transfer system of claim 1 wherein the means for applying an electrical field includes means for varying the electrical field to control the flow rate of the liquid fluid.

5. The thermal power transfer system of claim 1 wherein the heat exchange member is adjacent the barrier means.

6. A thermal power transfer system using a phase change liquid-gas sodium fluid in a closed loop configuration, comprising:
   a gas conduit;
   a liquid conduit;
   a heat exchange member for inputting thermal energy into the sodium so that the pressure of the gas conduit is higher than the liquid conduit;
   a beta-alumina electrolyte member positioned between the gas conduit and the liquid conduit, adjacent the heat exchange member, to maintain a pressure differential while permitting transmission of the sodium through the barrier means, the electrolyte member having the capability of transmitting sodium ions through the electrolyte member and a porous electrode operatively positioned relative to the electrolyte member for creating an electrical field across the electrolyte member to drive the sodium ions through the solid electrolyte member;
   means, attached to the electrode member, for applying an electrical field to force the sodium ions from the lower pressure liquid conduit to the higher pressure gas conduit, and
   means, connected to the gas conduit and liquid conduit for outputting thermal energy.

* * * * *